United States Patent
Okamoto et al.

(10) Patent No.: US 10,320,249 B2
(45) Date of Patent: Jun. 11, 2019

(54) PERMANENT MAGNET ROTATING ELECTRIC MACHINE AND METHOD FOR MANUFACTURING SAME

(71) Applicant: Hitachi Automotive Systems, Ltd., Hitachinaka-shi, Ibaraki (JP)

(72) Inventors: Hiromitsu Okamoto, Hitachinaka (JP); Masahiko Honma, Hitachinaka (JP); Toshio Ishikawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 223 days.

(21) Appl. No.: 15/117,837

(22) PCT Filed: Jan. 7, 2015

(86) PCT No.: PCT/JP2015/050201
§ 371 (c)(1),
(2) Date: Aug. 10, 2016

(87) PCT Pub. No.: WO2015/146210
PCT Pub. Date: Oct. 1, 2015

(65) Prior Publication Data
US 2016/0359384 A1 Dec. 8, 2016

(30) Foreign Application Priority Data
Mar. 24, 2014 (JP) .................. 2014-059507

(51) Int. Cl.
*H02K 1/27* (2006.01)
*H02K 1/32* (2006.01)
*H02K 15/03* (2006.01)

(52) U.S. Cl.
CPC .............. *H02K 1/276* (2013.01); *H02K 1/32* (2013.01); *H02K 15/03* (2013.01)

(58) Field of Classification Search
CPC ........... H02K 1/276; H02K 1/32; H02K 15/03
(Continued)

(56) References Cited

U.S. PATENT DOCUMENTS

2009/0115279 A1* 5/2009 Spaggiari ............... H02K 1/276
310/156.53
2009/0278417 A1* 11/2009 Mizuno .................. H02K 1/276
310/156.53

(Continued)

FOREIGN PATENT DOCUMENTS

DE   102012202529 A1 *  8/2013 ............. H02K 15/03
EP       2 249 460 A1    11/2010

(Continued)

OTHER PUBLICATIONS

International Search Report (PCT/ISA/210) issued in PCT Application No. PCT/JP2015/050201 dated Apr. 7, 2015 with English-language translation (four (4) pages).

(Continued)

*Primary Examiner* — Alex W Mok
(74) *Attorney, Agent, or Firm* — Crowell & Moring LLP (57) ABSTRACT

A permanent magnet rotating electric machine includes a stator and a rotor disposed with an air gap interposed between the stator and the rotor. The rotor is provided with a rotor core provided with a plurality of magnet insertion holes in a circumferential direction, and a press-fit body pressed into each of the magnet insertion holes. The press-fit body includes a permanent magnet and a magnet fixing member provided on the sides of the permanent magnet. The press-fit body is fixed within the magnet insertion hole in such a way that, in the circumferential direction, one end of the press-fit body makes a line contact with the inner wall of the magnet insertion hole through a line contact portion of the magnet fixing member and the other end thereof makes a surface contact with the inner wall of the magnet insertion (Continued)

holes through a surface contact portion of the magnet fixing member.

7 Claims, 9 Drawing Sheets

(58) Field of Classification Search
USPC .................................................. 310/156.11
See application file for complete search history.

(56) References Cited

U.S. PATENT DOCUMENTS

| | | |
|---|---|---|
| 2011/0057529 A1 | 3/2011 | Seidel et al. |
| 2013/0069468 A1* | 3/2013 | Nakamura .............. H02K 1/276 310/156.19 |
| 2013/0270956 A1* | 10/2013 | Yamaguchi .............. H02K 1/27 310/156.27 |
| 2014/0062244 A1 | 3/2014 | Sano et al. |
| 2014/0116286 A1* | 5/2014 | Huh ........................ H02K 29/12 105/49 |

FOREIGN PATENT DOCUMENTS

| | | |
|---|---|---|
| JP | 2002-359942 A | 12/2002 |
| JP | 2003-235189 A | 8/2003 |
| JP | 2003-274587 A | 9/2003 |
| JP | 2005-12859 A | 1/2005 |
| JP | 2011-508586 A | 3/2011 |
| JP | 2012-139074 A | 7/2012 |
| JP | 2014-45634 A | 3/2014 |

OTHER PUBLICATIONS

Japanese-language Written Opinion (PCT/ISA/237) issued in PCT Application No. PCT/JP2015/050201 dated Apr. 7, 2015 (three (3) pages).

* cited by examiner

PERMANENT MAGNET ROTATING ELECTRIC MACHINE AND METHOD FOR MANUFACTURING SAME

TECHNICAL FIELD

The present invention relates to a permanent magnet-type rotary electric machine and a manufacturing method for the permanent magnet-type rotary electric machine.

BACKGROUND ART

A rotary electric machine such as a motor includes a stator and a rotor. In a rotor core of the rotor, electromagnetic steel sheets are laminated which have a thickness of approximately 0.05 to 1.0 mm and includes a plurality of magnet insertion holes in a circumferential direction, and the electromagnetic steel sheets are integrated with the rotor core by such as caulking and fixing. In the magnet insertion hole of the rotor core, generally a permanent magnet is embedded, and also an adhesive is filled to fix the magnet. Fixing of a permanent magnet in an axial direction and a radial direction affects an adhesive condition and a fixing force of the adhesive. Further, in the case of enhancing reliability, a nonmagnetic presser plate which does not damage electromagnetic characteristics of a rotary electric machine is disposed in an axial direction to prevent dispersion of a permanent magnet by a force applied to a rotary electric machine. This presser plate also protects the permanent magnet inserted into the magnet insertion hole.

PTL 1 discloses a following configuration for fixing a permanent magnet to a rotor of a permanent magnet-type rotary electric machine. The permanent magnet is inserted and arranged in a magnet insertion hole provided to each magnetic pole of a rotor core, and also resin is filled in a gap of the magnet insertion hole. Accordingly, a crack of the permanent magnet can be prevented, and also a centrifugal force-resistant can be improved.

CITATION LIST

Patent Literature

PTL 1: JP 2002-359942 A

SUMMARY OF INVENTION

Technical Problem

However, in the invention described in PTL 1, a fixing strength of a permanent magnet by resin is likely to vary due to an operation method including operation environments such as a temperature and a humidity, and the fixing strength of the permanent magnet cannot be sufficiently obtained. Therefore, to improve product reliability, a manufacturing process needs to be strictly controlled in consideration of characteristics of an adhesive.

Further, due to recent soaring commodity markets of metal rare earth (such as neodymium and dysprosium), a technique to recycle a permanent magnet attached to a rotor is focused. However, in the invention described in the PTL 1, a permanent magnet fixed by resin cannot be easily removed from a magnet insertion hole of a rotor, and therefore operation efficiency is lowered.

Solution to Problem

The present invention is applied to a permanent magnet-type rotary electric machine including a stator and a rotor disposed corresponding to the stator via a gap. The above-described issue is solved by a configuration to be described below.

The rotor includes a rotor core including a plurality of magnet insertion holes in a circumferential direction and a press fit body press-fitted to each of the magnet insertion holes. The press fit body includes a permanent magnet extending in an insertion direction of the magnet insertion hole (a press fit body insertion direction) and a magnet fixing member formed of an elastic material and extended on a side surface of the permanent magnet in the press fit body insertion direction. In either one of a circumferential direction or a radial direction, the magnet fixing member includes, on one end, a line contact portion brought into line-contact with an inner wall of the magnet insertion hole in the press fit body insertion direction and includes, on another end, a surface contact portion brought into surface-contact with the inner wall of the magnet insertion hole. The line contact portion and the surface contact portion come into contact with the inner wall, and consequently the press fit body is fixed in the magnet insertion hole.

The present invention is also applied to a method for manufacturing a permanent magnet-type rotary electric machine including a stator and a rotor disposed corresponding to the stator via a gap. The above-described issue is solved by a configuration to be described below.

A rotor is manufactured by steps for: preparing a rotor core in which a plurality of steel sheets including magnet insertion holes in an axial direction is laminated; preparing a press fit body at least including a permanent magnet and a magnet fixing member formed of an elastic material and provided on a side surface of the permanent magnet; and fixing the press fit body in the magnet insertion hole by press-fitting the press fit body in the magnet insertion hole while the press fit body is brought into line-contact with an inner wall of the magnet insertion hole by the magnet fixing member on one end and brought into surface-contact with the inner wall of the magnet insertion hole by the magnet fixing member on another end, on either one of a circumferential direction or a radial direction when the press fit body is inserted into the magnet insertion hole. A permanent magnet-type rotary electric machine is manufactured by arranging the manufactured rotor on an inner peripheral side or an outer peripheral side of the stator.

Advantageous Effects of Invention

According to the present invention, a manufacturing process for a permanent magnet-type rotary electric machine can be simplified, and a permanent magnet can be easily recycled.

DESCRIPTION OF EMBODIMENTS

Embodiments according to the present invention will be described with reference to FIGS. 1 to 7(b). A permanent magnet-type rotary electric machine according to each embodiment to be described below (hereinafter, simply called a rotary electric machine) is a rotary electric machine driving an electric vehicle. Examples of an electric vehicle including the rotary electric machine include a hybrid-type electric vehicle (HEV) including both of an engine and a rotary electric machine and a pure electric vehicle (EV) including a rotary electric machine without including an engine. The rotary electric machine to be described below can be used in both of them. As an example, a rotary electric machine for an HEV will be described below.

First Embodiment

Figure 1:
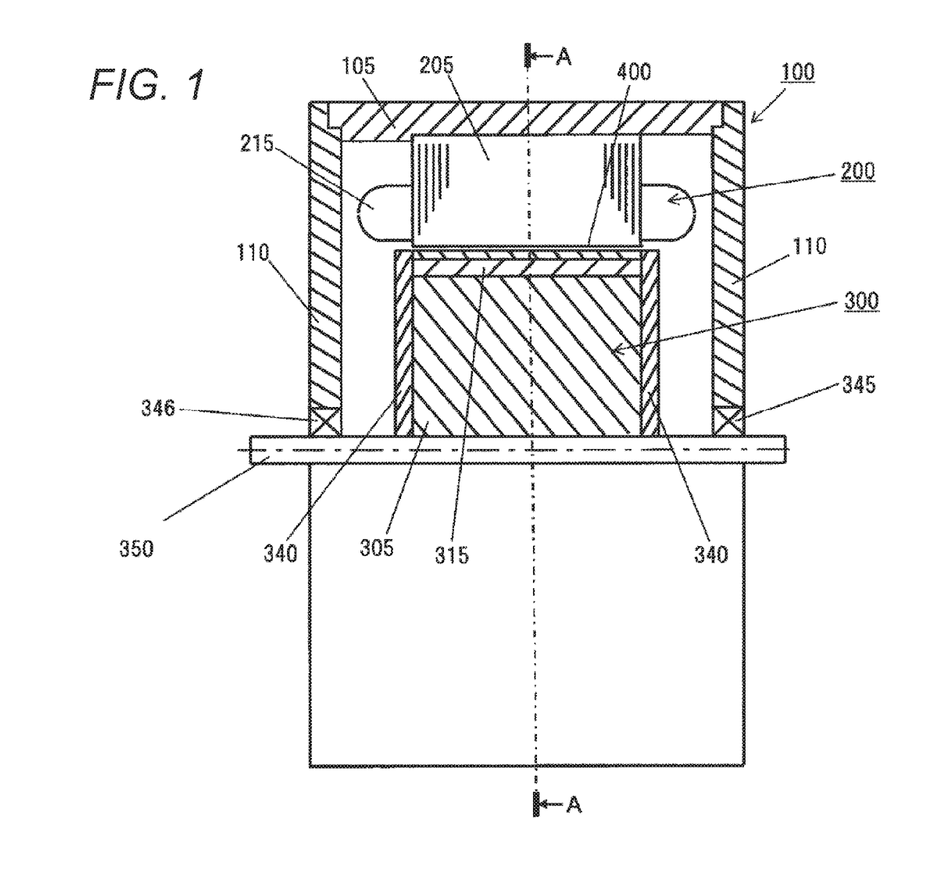
FIG. 1 is a schematic view illustrating an overall configuration of a permanent magnet-type rotary electric machine according to an embodiment of the present invention.

FIG. 1 is a schematic view illustrating an overall configuration of a rotary electric machine 100 according to the embodiment. FIG. 1 illustrates the inside of the rotary electric machine 100 by setting a part of the rotary electric machine 100 as a sectional surface.

A stator 200 is supported in a housing 105 and includes a stator core 205 and a stator winding 215. A rotor 300 is rotationally supported via a gap 400 on an inner peripheral side of the stator core 205. The rotor 300 includes a rotor core 305 fixed to a shaft 350, a permanent magnet 315, and a nonmagnetic end plate 340. A housing 105 includes a pair of end brackets 110 including bearings 345 and 346, and the shaft 350 is rotationally supported by the bearings 345 and 346.

The rotary electric machine 100 is a three-phase synchronous motor incorporating a permanent magnet. The rotary electric machine 100 operates as an electric motor, which rotates the rotor 300, by supplying three-phase AC power to the stator winding 215 wound around the stator core 205. Further, the rotary electric machine 100 operates as a power generator and outputs generated three-phase AC power when being driven by an engine. Specifically, the rotary electric machine 100 has both of a function as a motor for generating a rotation torque based on electric energy and a function as a power generator for generating power based on mechanical energy, and the rotary electric machine 100 can selectively use the functions according to a running state of a vehicle.

Figure 2:
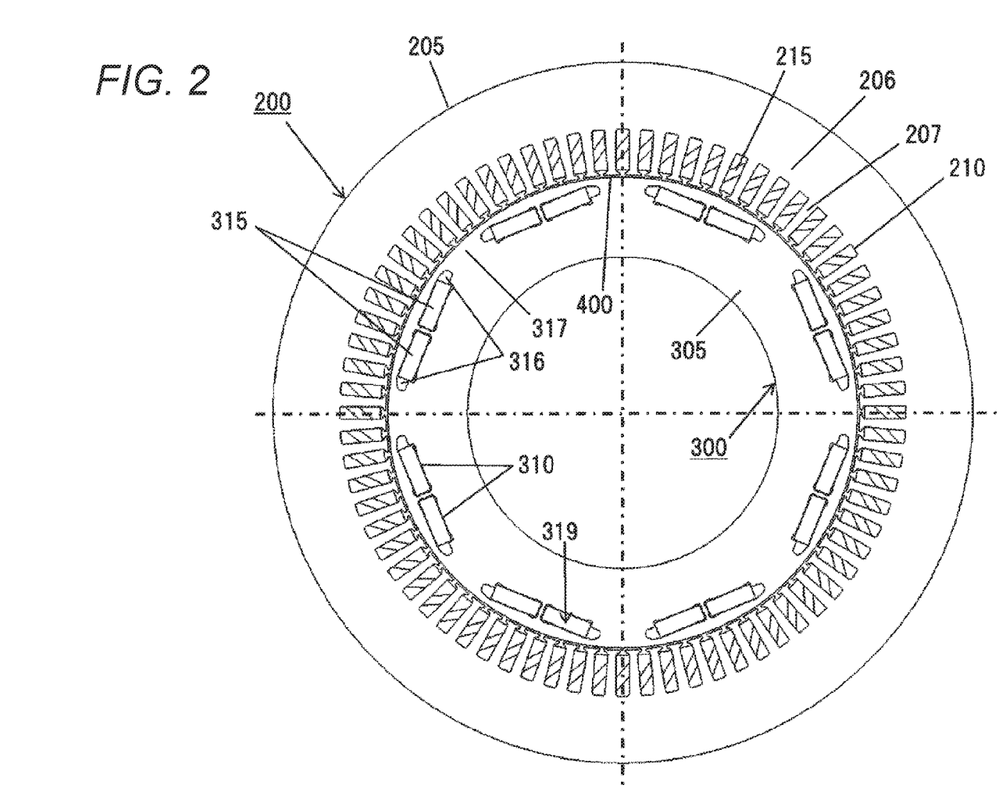
FIG. 2 is a sectional view illustrating a rotor and a stator of the permanent magnet-type rotary electric machine according to the embodiment of the present invention.

FIG. 2 is a schematic view illustrating a sectional surface of the stator 200 and the rotor 300 illustrated in FIG. 1 and illustrates a sectional view on line A-A of FIG. 1. In FIG. 2, the housing 105 and the shaft 350 are not described.

The stator core 205 is formed by laminating a plurality of magnetic bodies, such as a plurality of electromagnetic steel sheets, in an axial direction, and the stator core 205 includes a yoke (also called a core back) and a teeth (also called a projection or a salient pole). The yoke includes a cylindrical yoke core 206 (called a core back) fitted in an inner peripheral side of the housing 105. The teeth projects on an inner peripheral side in a radial direction of the yoke core 206 and includes a plurality of teeth cores 207 arranged in a circumferential direction at predetermined intervals. In the embodiment, seventy two teeth cores 207 are formed on an inner peripheral side of the yoke core 206. Therefore, in the embodiment, the stator 200 in which seventy two stator poles are provided can be obtained.

By forming the teeth core 207, a slot 210 is formed between the adjacent teeth cores 207. In the slot 210, a slot insulation (not illustrated) is provided, and a plurality of phase windings of a U-phase, a V-phase, and a W phase which form the stator 200 are mounted. In the embodiment, the stator winding 215 is wound by distributed winding. Here, the distributed winding is a winding method in which a phase winding of each phase is wound by dispersing to several slots. In the embodiment, the distributed winding is used as a winding method. Therefore, by using a field weakening control and a reluctance torque, a wide rotation speed range from a low rotation speed to a high rotation speed can be controlled.

The rotor 300 includes the rotor core 305 and the permanent magnet 315 held by a magnet insertion hole 310 formed to the rotor core 305. The magnet insertion holes 310 are formed to the rotor core 305 at equal intervals in a circumferential direction near an outer periphery, and a permanent magnet 315 is provided in each of the magnet insertion holes 310. A width in a circumferential direction of the magnet insertion hole 310 is formed larger than a width in a circumferential direction of the permanent magnet 315, and magnetic gaps 316 are formed on both sides in a circumferential direction of the permanent magnet 315. In FIG. 2, the permanent magnet 315 in which a magnet fixing member 320 is formed is indicated as a press fit body 319. The press fit body 319 will be described in FIG. 4.

The permanent magnet 315 forms a field magnetic pole of the rotor 300. In the embodiment, two permanent magnets 315 form one magnetic pole, and eight poles are formed. However, one magnetic pole may be formed by other than two permanent magnets. In other words, one magnetic pole may be formed by one permanent magnet or more than three permanent magnets. In the case where a magnet size is constant, a magnetic flux density of each magnetic pole generated by a permanent magnet is increased as increasing a permanent magnet for forming each magnetic pole, and a magnetic torque can be increased.

A magnetization direction of the permanent magnet 315 faces in a radial direction, and a magnetization direction of a magnetic pole is opposite to a magnetization direction of an adjacent magnetic pole. Specifically, if a polarity on a stator side of the permanent magnet 315 for forming a magnetic pole is magnetized to an N-pole, and a polarity on a shaft side is magnetized to an S-pole, a polarity on a stator side of the permanent magnet 315 forming an adjacent magnetic pole is magnetized to an S-pole, and a polarity of a shaft side thereof is magnetized to an N-pole. Two permanent magnets forming one magnet pole are set to the same pole. In other words, magnetic poles on outer peripheral sides are set equal to each other, and magnetic poles on inner peripheral sides are set equal to each other. According to the embodiment, two permanent magnets 315 magnetized to the both poles form one magnetic pole, and eight magnetic poles are disposed at equal intervals in a circumferential direction. Further, a polarity of the magnetic pole is set opposite to a magnetic pole of a magnetic pole adjacent in a circumferential direction. Accordingly, the rotor 300 forms eight magnetic poles.

The permanent magnet 315 may be embedded in the magnet insertion hole 310 of the rotor core 305 after magnetization and also may be inserted into the magnet insertion hole 310 of the rotor core 305 before magnetization and then magnetized by applying a strong magnetic field.

However, the permanent magnet 315 after magnetization has a strong magnetic force, and when the permanent magnet 315 is magnetized before the permanent magnet 315 is fixed to the rotor 300, a strong suction force is generated between the permanent magnet 315 and the rotor core 305 when the permanent magnet 315 is fixed, and this suction force may disturb an operation. Further, by the strong suction force, scraps such as iron powders may be attached to the permanent magnet 315. Therefore, a method in which the permanent magnet 315 is magnetized after being inserted into the magnet insertion hole 310 of the rotor core 305 is preferable to increase a productivity of the rotary electric machine 100. Here, sintered magnets and bonded magnets of a neodymium type, a samarium type, and a ferrite type are used for the permanent magnet 315. However, a neodymium type sintered magnet is preferable in the case of increasing a residual magnetic flux density of the permanent magnet 315.

In general, an axis passing through the center of a magnetic pole is called a d-axis, and an axis passing through between magnetic poles is called a q-axis. At this time, an iron core portion passing through the q-axis is called an auxiliary magnetic pole 317. A permeability of the permanent magnet 315 provided to the rotor 300 is almost same as a permeability of air. Therefore, when viewed from an outer peripheral side of the rotor 300, the d-axis portion is magnetically recessed, and the q-axis portion is magnetically projected. Therefore, an iron core portion of the q-axis portion, specifically the auxiliary magnetic pole 317 is called a salient pole. A reluctance torque is generated by a permeability ratio, specifically by a salient pole ratio, of magnetic fluxes of the d-axis and the q-axis (a magnetic inductance). The auxiliary magnetic pole 317 acts such that a reluctance of a magnetic flux of the q-axis in which the stator winding 215 is generated is decreased. By the auxiliary magnetic pole 317, a reluctance of the magnetic flux of the q-axis is significantly decreased in comparison with a reluctance of a magnetic flux of the d-axis. Therefore a large reluctant torque is generated.

When a rotating magnetic field is generated to the stator 200 by supplying a three-phase AC power to the stator winding 215, this rotating magnet field acts to the permanent magnet 315 of the rotor 300, and a magnet torque is generated. Specifically, the above-described reluctance torque is generated to the rotor 300 in addition to the magnet torque. Therefore, both of the torques act as a rotary torque, and a large rotary torque can be obtained.

Figure 3:
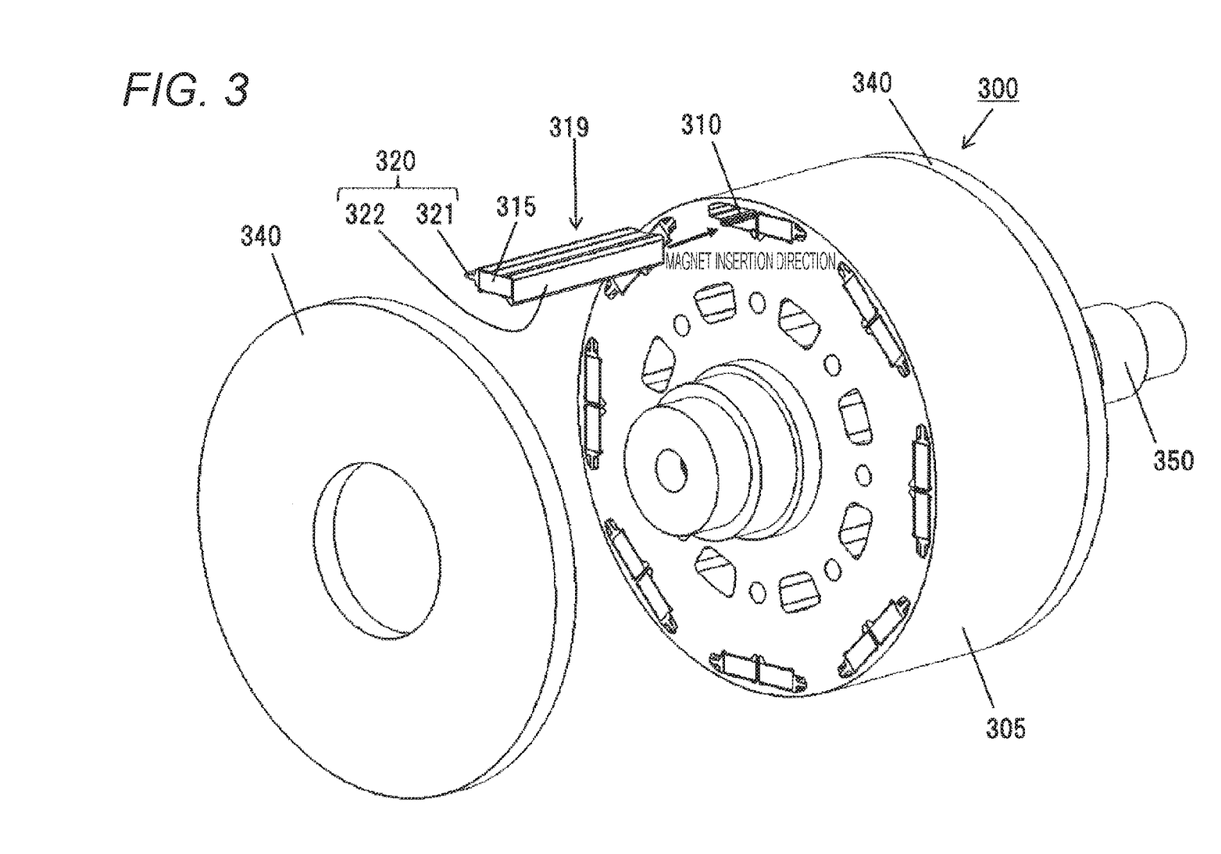
FIG. 3 is a perspective view illustrating a configuration of a rotor of a permanent magnet-type rotary electric machine according to a first embodiment of the present invention.

FIG. 3 is a perspective view illustrating a configuration of the rotor 300 of the rotary electric machine 100 according to the embodiment. As illustrated in FIG. 3, the rotor 300 includes the rotor core 305, the press fit body 319, the shaft 350, and the nonmagnetic end plate 340. The rotor core 305 has a hollow cylindrical shape as a whole by laminating circular-shape electromagnetic steel sheets in a rotating axial direction. The press fit body 319 is inserted into the magnet insertion hole 310 of the rotor core 305 (refer to a description described below). The shaft 350 is inserted into a center hole of the rotor core 305 and becomes a rotary axis of the rotor 300. The nonmagnetic end plate 340 is disposed so as to sandwich both end surfaces of the rotor core 305 to more certainly fix the press fit body 319.

On a surface facing a rotor of the end plate 340, a refrigerant introducing groove (not illustrated) is formed from an outer peripheral edge to a position facing the magnet insertion hole to let refrigerant flow through gaps 330 and 331 to be described later. Alternatively, a through hole (not illustrated) may be formed to the end plate 340 in an axial direction at a position facing the gaps 330 and 331.

Figure 4:
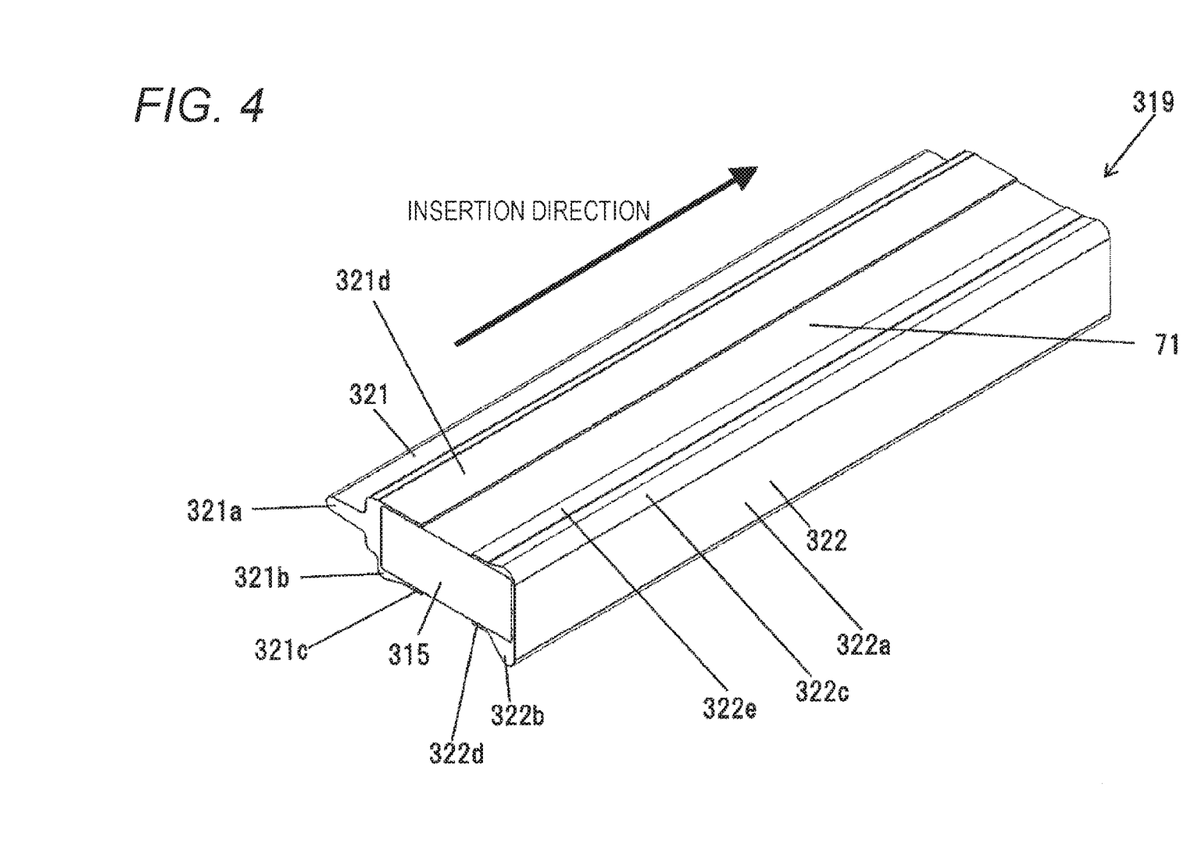
FIG. 4 is a perspective view illustrating a configuration of a press fit body fixed to the rotor of the permanent magnet-type rotary electric machine according to the first embodiment of the present invention.

As illustrated in FIG. 4, the permanent magnet 315 has a rectangular parallelepiped shape, and a magnet fixing member 320 formed of such as resin is formed on four side surfaces facing an inner wall of the magnet insertion hole 310 of the rotor core 305. Here, a member integrally formed by the permanent magnet 315 and the magnet fixing member 320 is called the press fit body 319 in the embodiment.

A first press fit portion 321 and a second press fit portion 322 are formed over the full length in a magnet insertion direction so as to correspond respectively to one short side end and another short side end of the inner wall of the magnet insertion hole 310 of the four side surfaces facing the above-described inner wall.

The first press fit portion 321 includes a first line contact portion 321a which covers a narrow face of one short side end of the inner wall of the magnet insertion hole and projects toward the inner wall. The first press fit portion 321 is connected to the line contact portion 321a and includes a first surface contact portion 321b, a second surface contact portion 321c, and a third surface contact portion 321d. The first surface contact portion 321b is expanded from a corner on a wide surface on a long side. The second surface contact portion 321c covers the center of the wide surface by being connected to the first surface contact portion 321b. The third surface contact portion 321d covers the center on the wide surface by being connected to the line contact portion 321a.

The second press fit portion 322 includes a fourth surface contact portion 322a, a fifth surface contact portion 322b, a sixth surface contact portion 322c, a seventh surface contact portion 322d, and an eighth surface contact portion 322e. The fourth surface contact portion 322a covers a narrow surface of another short side end of the inner wall. The fifth surface contact portion 322b and the sixth surface contact portion 322c are expanded from a corner on a wide surface corresponding to long side vertical surfaces on the inner wall. The seventh surface contact portion 322d covers the center of the wide surface by being connected to the fifth surface contact portion 322b. The eighth surface contact portion 322e covers the center on the wide surface by being connected to the sixth surface contact portion 322c.

The magnet fixing member 320 is formed on a surface of the permanent magnet 315 by injection-molding resin by using a pattern before being inserted into the magnet insertion hole 310 of the rotor core 305. Specifically, the press fit body 319 is molded before being inserted (press-fitted) into the magnet insertion hole 310. Maximum sizes in a radial direction and a circumferential direction of the press fit body 319 are set so as to be larger than maximum sizes of the magnet insertion hole 310, and the press fit body 319 is partially press-fitted when being inserted into the magnet insertion hole 310.

The magnet fixing member 320 is formed of an elastic body which has a lower modulus than a material of the rotor core 305 such as resin and rubber. Further, the magnet fixing member 320 preferably has a high thermal conductivity, a high fluidity during injection molding, and an insulation properties.

A part of a side surface of the permanent magnet 315, specifically the center of vertical wide surfaces, of the press fit body 319 is not covered by the magnet fixing member 320. Consequently, a magnet exposed region 71 is provided to the press fit body 319.

The magnet fixing member 320 is consecutively formed along an insertion direction (called a magnet insertion direction or a press fit body insertion direction) to the magnet insertion hole 310. Specifically, the magnet fixing member 320 is extended in the magnet insertion direction of the permanent magnet 315. The rotor core 305 is formed by laminating a plurality of electromagnetic steel sheets in a rotating axial direction as described above. Therefore, the magnet insertion hole 310 is drilled over a whole area in the rotating axial direction of the rotor core 305, specifically between both end surfaces of a rotor. In the first embodiment, one magnet fixing member 320 is provided over the whole area in the rotating axial direction of the rotor core 305, specifically between both end surfaces of the rotor.

Accordingly, the magnet exposed region 71 extends in a magnet insertion direction of the permanent magnet 315.

Figure 5:
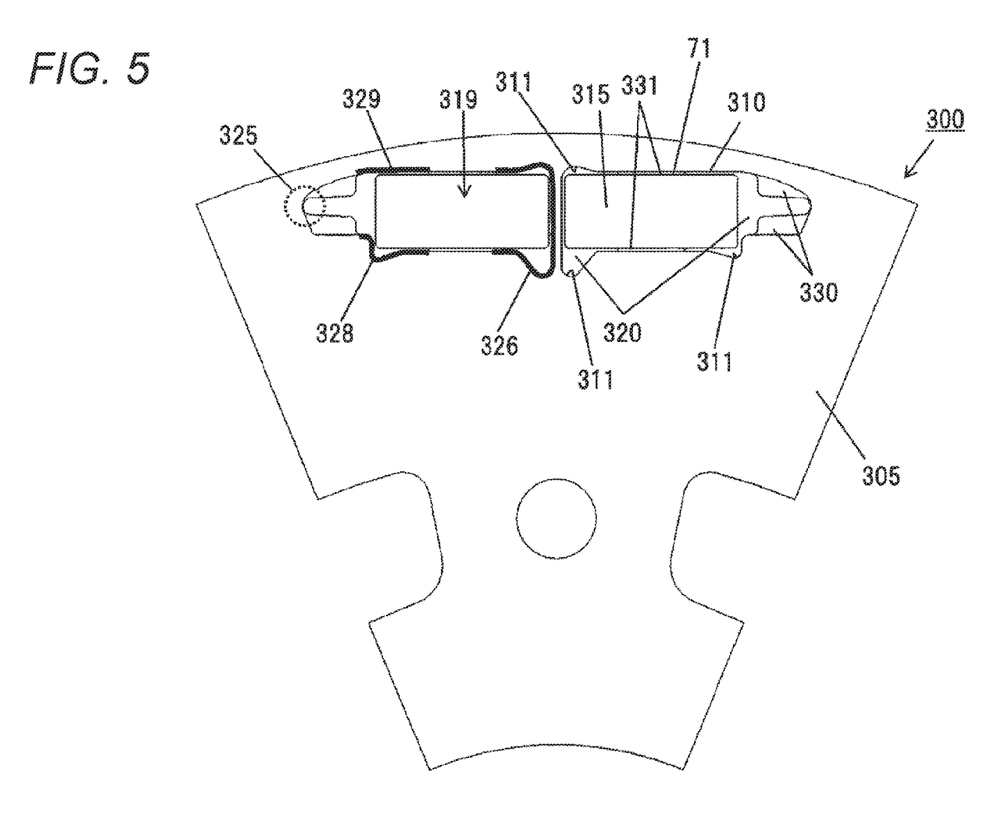
FIG. 5 is a sectional view of the rotor of the permanent magnet-type rotary electric machine according to the first embodiment of the present invention.

FIG. 5 is a sectional enlarged view of the rotor 300 of the rotary electric machine 100. The press fit body 319 inserted into the magnet insertion hole 310 is designed such that, in either of a circumferential direction or a radial direction, one end is brought into line-contact with an inner wall of the magnet insertion hole 310, and another end is brought into surface-contact with the inner wall of the magnet insertion hole 310. if it is described as an example by the press fit body 319 on the left side in FIG. 5, the left end in a circumferential direction of the press fit body 319 in the drawing is brought into line-contact in a rotating axis direction with an inner wall of the magnet insertion hole 310 at a line contact portion 325 (an area indicated by a dotted-line circle in FIG. 5), and three side surfaces on the right end side in a circumferential direction in the drawing are brought into surface-contact with the inner wall of the magnet insertion hole 310 as a surface contact portion 326 (bold lines in FIG. 5) Two side walls on the left end side in the drawing are brought into surface-contact with the inner wall of the magnet insertion hole 310 as surface contact portions 328 and 329.

The surface contact portions 326 on the right side are surface contact portions 322a, 322b, 322c, 322d, and 322e in FIG. 4. Further, the surface contact portion 328 on the lower left side indicate the surface contact portions 321b and 321c in FIG. 4, and the surface contact portion 329 on the upper left side indicates a surface contact portion 321d in FIG. 4.

The magnet insertion hole 310 includes an inner wall surface corresponding to an outline shape of the magnet fixing member 320. Specifically, a sectional surface of the magnet insertion hole 310 has a shape elongating in a circumferential direction. An inner wall surface brought into contact with a projected portion of the line contact portion 321a is formed on one end side, and an inner wall surface brought into contact with a surface of the fourth surface contact portion 322a is formed on another end side. In addition, an inner wall surface of the magnet insertion hole includes an inner wall surface brought into surface-contact with the first surface contact portion 321b, the second surface contact portion 321c, the third surface contact portion 321d, the fifth surface contact portion 322b, the sixth surface contact portion 322c, the seventh surface contact portion 322d, and the eighth surface contact portion 322e.

The line contact portion 325 is provided to the magnet fixing member 320, and therefore when the press fit body 319 is press-fitted into the magnet insertion hole 310, the line contact portion 325 of the magnet fixing member 320 is more elastic than the surface contact portions 326, 328, and 329, and insertion characteristics thereof can be improved. On the other hand, by providing the surface contact portions 321b to 321d and 322a to 322e, a fixing strength and a thermal conductivity in the magnet insertion hole 310 of the press fit body 319 can be improved.

A dent 311 with which the surface contact portions 321b, 322b, and 322c come into contact is formed at a corner of the magnet insertion hole 310. The surface contact portions 321b, 322b, and 322c are brought into surface-contact with the dent wall surface, and consequently it is prevented that the press fit body 319 is displaced by forces in a radial direction and a circumferential direction.

Since the magnet fixing member 320 includes the line contact portion 325 and the surface line contact portion 326, a gap is provided between the magnet fixing member 320 and an inner wall surface of the magnet insertion hole 310. Here, the gap facing only the inner wall of the magnet insertion hole 310 and the magnet fixing member 320 is numbered 330.

Further, a part of a side surface of the permanent magnet 315 is not covered by the magnet fixing member 320. In other words, a gap is provided between the permanent magnet 315 and an inner wall of the magnet insertion hole 310 by providing the magnet exposed region 71. Here, the gap facing only the inner wall of the magnet insertion hole 310, the magnet fixing member 320, and the magnet exposed region 71 is numbered 331. According to the embodiment, sizes of the permanent magnet 315 and the magnet fixing member 320 are set such that a width of the gap 331 in a vertical direction in FIG. 5 (a magnetization direction) comes to 0.05 to 0.1 mm.

The gaps 330 and 331 enable a refrigerant to flow for cooling the permanent magnet 315 and the magnet fixing member 320 and can suppress that a temperature of the permanent magnet 315 is increased by heating due to an eddy current. The refrigerant flowing in the gap 331 directly cools the permanent magnet 315. However, the refrigerant flowing in the gap 330 cools the permanent magnet 315 via the magnet fixing member 320 or via the magnet fixing member 320 and the rotor core 305.

As described above, the magnet fixing member 320 and the magnet exposed region 71 extend in a magnet insertion direction of the permanent magnet 315, and consequently the gaps 330 and 331 are consecutively formed along an insertion direction to the magnet insertion hole 310. Specifically, the gaps 330 and 331 extend in the magnet insertion direction of the permanent magnet 315. Therefore, a pressure loss can be reduced when a refrigerant passes through the gaps 330 and 331 and flows from one end to another end in an axial direction of the rotor 300.

According to the first embodiment, the following effects can be obtained.

(1) The rotary electric machine 100 according to the present invention is a permanent magnet-type rotary electric machine including the stator 200 and the rotor 300 disposed corresponding to the stator 200 via a gap. The rotor 300 includes the rotor core 305 and the press fit body 319. The rotor core 305 includes a plurality of the magnet insertion holes 310 in a circumferential direction. The press fit body 319 is press-fitted to each of the magnet insertion holes 310.

The press fit body 319 includes the permanent magnet 315 and the magnet fixing member 320. The permanent magnet 315 is extended in a rotating axial direction. The magnet fixing member 320 is formed of an elastic material and extended in the rotating axial direction on a side surface of the permanent magnet 315. In either one of a circumferential direction or a radial direction, as an example, in the circumferential direction in FIG. 5, one end of the press fit body 319 is brought into line-contact with an inner wall of the magnet insertion hole 310 by the magnet fixing member 320, and another end is fixed in the magnet insertion hole 310 by being brought into surface-contact with the inner wall of the magnet insertion hole 310 by the magnet fixing member 320. Specifically, the magnet fixing member 320 includes the line contact portion 325 (321a) on one end and the surface contact portion 326 (322a) on another end. The line contact portion 325 (321a) comes into line-contact with an inner wall of the magnet insertion hole 310 in a press fit body insertion direction. The surface contact portion 326 (322a) comes into surface-contact with the inner wall of the magnet insertion hole 310. The line contact portion 325 and the surface contact portion 326 are brought into contact with the inner wall of the magnet insertion hole 310, and consequently the press fit body 319 is fixed in the magnet insertion hole 310.

Consequently, a permanent magnet can be fixed to a magnet insertion hole without using an adhesive. Further, in comparison with conventional fixing methods in which a permanent magnet is fixed to a magnet insertion hole by using an adhesive or in which a permanent magnet is fixed to a magnet insertion hole by filling resin, a magnet can be easily removed from a rotor core, and as a result, the permanent magnet can be easily recycled.

Further, the press fit body 319 is press-fitted to the magnet insertion hole 310 so as to come into line-contact with an inner wall on one end and come into surface-contact with the inner wall on another end. Therefore, in comparison with a method in which a whole periphery of the inner wall of the magnet insertion hole 310 is brought into surface-contact with the magnet fixing member 320, the line contact portion 325 is easily deformed, and the press fit body 319 is easily press-fitted to the magnet insertion hole 310.

In comparison with the invention described in JP 2005-12859 A (for example, the permanent magnet 5 including the coating layer 7 in FIG. 4), the present invention differs as described below.

An issue in the present invention is to improve assembling and disassembling characteristics of the permanent magnet. On the other hand, an issue in the invention disclosed in JP 2005-12859 A is to improve a thermal conductivity from a magnet to a rotor. In the present invention, an adhesive fixing method is not used which causes a problem in assembling and dissembling characteristics, and a press-fitting method is used in which an adhesive is not used.

(2) The line contact portion 325 and the surface contact portion 326 of the magnet fixing member 320 extend so as to come into contact with an inner wall of the magnet insertion hole 310 in a whole area in the press fit body insertion direction. Therefore, press-fitting can be smoothly performed.

(3) The gaps 330 and 331 communicating between end surfaces in an axial direction of the rotor core 305 are provided between an inner wall of the magnet insertion hole 310 and the press fit body 319. Specifically, the press fit body 319 includes the exposed region 71 in which the permanent magnet 315 is exposed in which the magnet fixing member 320 is not provided. The press fit body 319 also includes the first gap 330 and the second gap 331. The first gap 330 is defined by facing an inner wall of the magnet insertion hole 310 and the line contact portion 325 of the magnet fixing member 320. The second gap 331 is defined by facing the inner wall of the magnet insertion hole 310 and the exposed region 71 of the permanent magnet 315.

A refrigerant flows in the gaps 330 and 331 extending in a press fit body insertion direction, and consequently the permanent magnet 315 can be cooled. Therefore, assembling and disassembling characteristics of the permanent magnet 315 can be improved, and the permanent magnet can be easily cooled.

Especially, the gap 330 is a gap facing only an inner wall of the magnet insertion hole 310 and the magnet fixing member 320. Therefore, a refrigerant flowing through the gap 330 does not come into contact with the permanent magnet 315, and therefore deterioration of the permanent magnet 315 due to contact with a refrigerant can be prevented.

The gap 331 is a gap in which the permanent magnet 315 directly faces an inner wall of the magnet insertion hole 310. Therefore, a refrigerant flowing in the gap 331 directly cools the permanent magnet 315, and therefore the permanent magnet 315 can be easily cooled.

(4) A force (centrifugal force) is applied to the press fit body 319 in a radial direction when a rotation speed of the rotor 300 is constant. Further, the force is applied also in a circumferential direction when the rotation speed of the rotor 300 is not constant. When such force is applied to the press fit body 319, the press fit body 319 is likely to be displaced. Therefore, in the present invention, dents 311 are provided at three corners of the magnet insertion hole 310, and the dents 311 come into surface-contact with the surface contact portions 321b, 322b, and 322c of the magnet fixing member 320. Consequently, the magnet fixing member 320 is likely to have an anchoring effect, and it can be prevented that the press fit body 319 is displaced in the magnet insertion hole 310 in radial and circumferential directions.

(5) The permanent magnet-type rotary electric machine according to the present invention is manufactured as described below.

First, a rotor is manufactured according to the following steps A to C.

A. A step for preparing a rotor core in which a plurality of electromagnetic steel sheets having magnet insertion holes is laminated in a rotating axial direction.

B. A step for preparing a press fit body at least including a permanent magnet and a magnet fixing member formed of an elastic material and provided on a side surface of the permanent magnet.

C. A step for fixing the press fit body to the magnet insertion hole by press-fitting the press fit body to the magnet insertion hole while the press fit body is brought into line-contact with an inner wall of the magnet insertion hole by the magnet fixing member on one end and brought into surface-contact with the inner wall of the magnet insertion hole by the magnet fixing member on another end, in either one of a circumferential direction or a radial direction when the press fit body is inserted into the magnet insertion hole.

The rotor manufactured in this manner is arranged via a gap on an inner peripheral side of a stator.

Second Embodiment

A second embodiment of a rotary electric machine 100 according to the present invention will be described with reference to FIGS. 6, 7(a), and 7(b).

Figure 6:
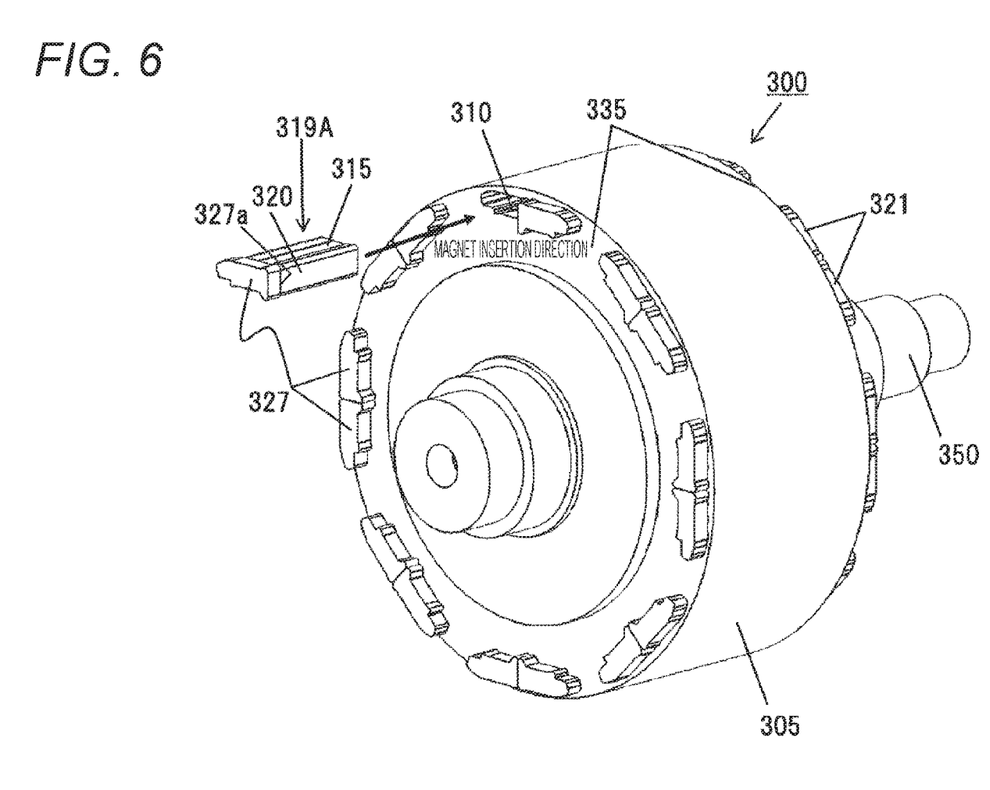
FIG. 6 is a perspective view illustrating a configuration of the rotor of the permanent magnet-type rotary electric machine according to a second embodiment of the present invention.

FIG. 6 is a perspective view illustrating a configuration of a rotor 300 of the rotary electric machine 100 according to the second embodiment of the present invention. FIG. 7(a) is a perspective view illustrating a permanent magnet 315 fixed to the rotor 300 of the rotary electric machine 100 according to the second embodiment of the present invention. FIG. 7(b) is a sectional view on line b-b of FIG. 7(a). In the drawings, components same as or corresponding to those in the first embodiment are denoted by the same reference sign, and a description thereof is simplified.

In the first embodiment, one press fit body 319 is used in a press fit body insertion direction. However, a press fit body 319A according to the embodiment is divided into two in the press fit body insertion direction, and each press fit body 319A is inserted into a magnet insertion hole 319A from both end surfaces in an axial direction of the rotor core 305. As illustrated in FIGS. 7(a) and 7(b), each of the press fit body 319A according to the embodiment includes a permanent magnet 315, a magnet fixing member 320A, and a magnet protection member 327 to be described later. The magnet fixing member 320A and the magnet protection member 327 are formed on a surface of the permanent magnet 315 by injection molding.

One of the press fit bodies 319A is, as illustrated in FIG. 6, inserted (press-fitted) into a magnet insertion hole 310 opening on an end surface on a front side of the rotor core 305. Another one of the press fit bodies 319A is inserted (press-fitted) into the magnet insertion hole 310 opening on a deep side end surface of the rotor core 305. In either one of a circumferential direction or a radial direction of the press fit body 319, the magnet fixing member 320 after being inserted into the magnet insertion hole 310 comes into line-contact with an inner wall of the magnet insertion hole 310 by a line contact portion 325 on one end and comes into surface-contact with the inner wall of the magnet insertion hole 310 by a surface contact portion 326 on another end. A contact state of the inner wall of the magnet insertion hole 310 and the press fit body 319A according to the embodiment is same as the contact state in the first embodiment illustrated in FIG. 5. Therefore, as in the first embodiment, gaps 330 and 331 are formed.

Figure 7A:
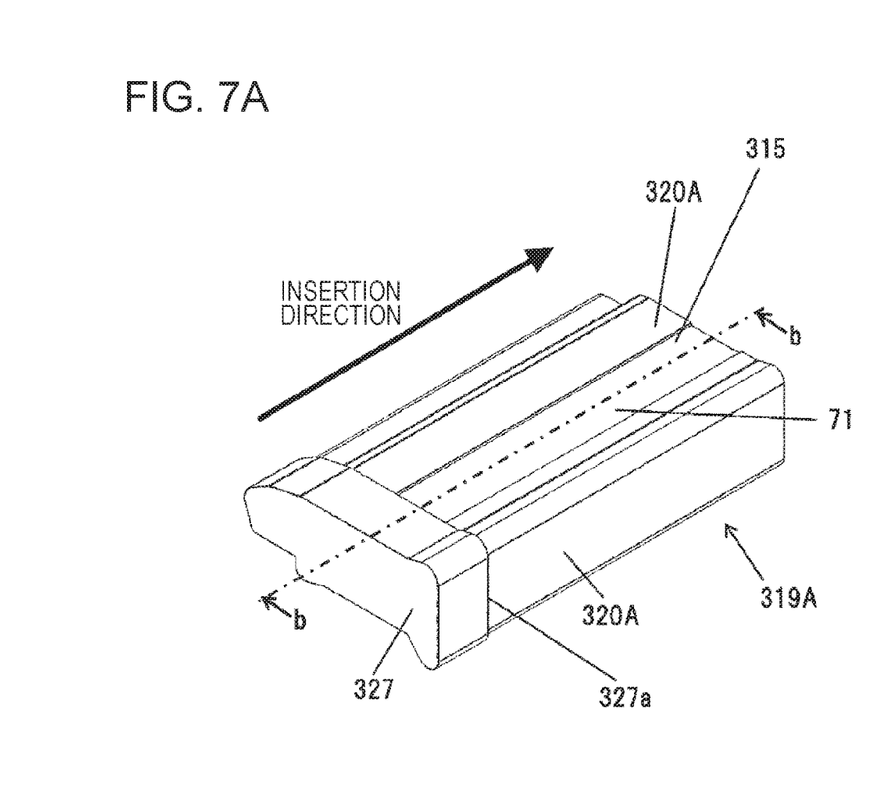
FIG. 7A is a perspective view illustrating a configuration of a permanent magnet fixed to the rotor of the permanent magnet-type rotary electric machine according to the second embodiment of the present invention.
Figure 7B:
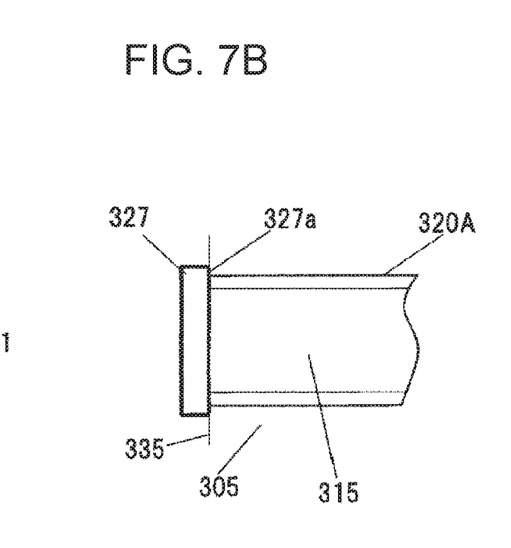
FIG. 7B is a sectional view on line b-b of FIG. 7A.

Each of the press fit bodies 319A according to the embodiment divided into two in the press fit body insertion direction includes the magnet protection member 327 on a front side end in the press fit body insertion direction as illustrated in FIGS. 7(a) and 7(b). The magnet protection member 327 is projected from the rotor core end surface 335 which is a rotating axial direction end surface of the rotor 300. The magnet protection member 327 is not provided on an tip side which is an another end of the insertion direction of the press fit body 319A, specifically the center of the magnet insertion hole 310.

A projection size in a press fit body insertion direction of the magnet protection member 327 is preferably set to be 1.0 to 10.0 mm from the rotor core end surface 335. An outer periphery of the magnet protection member 327 is set to be slightly larger than an outer periphery of a portion press-fitted into the magnet insertion hole 310 of the press fit body 319A. Therefore, as illustrated in FIGS. 6 and 7 (b), the magnet protection member 327 comes into contact with the rotor core end surface 335 by a surface 327a. A through hole (not illustrated) for passing a refrigerant to the gaps 330 and 331 is provided to the magnet protection member 327.

A damage on the permanent magnet 315 inserted into the magnet insertion hole 310 of the rotor core 305 can be prevented by providing the magnet protection member 327. In that sense, an end plate provided on the both end surfaces 335 of the rotor core 305 can be eliminated, and assembling characteristics of the rotor 300 can be improved, and the number of components can be reduced.

According to the second embodiment, in addition to operation effects in the first embodiment, further following effects can be obtained.

The magnet protection member 327 projected from the rotor core end surface 335 is provided to each of the press fit bodies 319A divided into two in the second embodiment. The magnet protection member 327 is provided so as to cover an insertion direction end surface of the magnet 315. Specifically, the press fit body 319A is divided into two in a press fit body insertion direction. The magnet protection member 327 is provided, which projects in an axial direction from the rotor core end surface 335 while being connected to the line contact portion 325 and the surface contact portion 326 and has a contour shape larger than a contour shape of the magnet insertion hole 310, on a rotor core end surface side of the divided first and second press fit bodies 319A, and the magnet protection member 327 comes into contact with the rotor core end surface 335.

Such the magnet protection member 327 can prevent a damage of the permanent magnet 315.

Since the magnet protection member 327 protects the permanent magnet 315, an end plate can be eliminated in that sense, and assembling characteristics of the rotor 300 can be improved, and the number of components can be reduced.

A deformation to be described below is within a range of the present invention, and one or a plurality of the variations can be combined with the above-described embodiments.

Figure 8A:
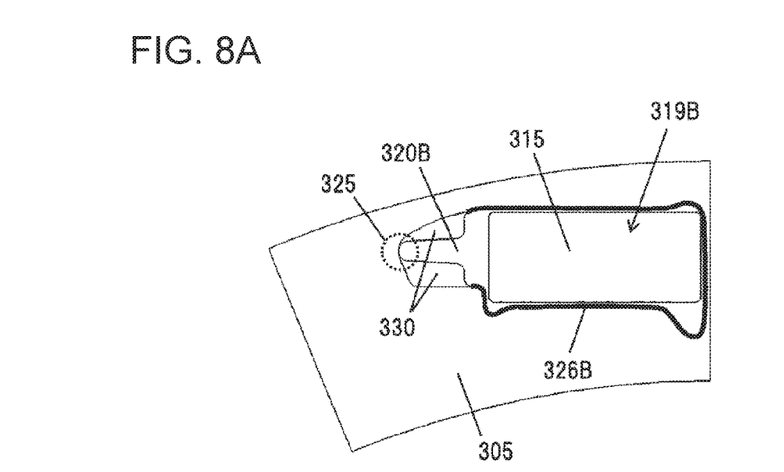
FIGS. 8A-8C illustrates a first variation of a magnet fixing member.
Figure 8B:
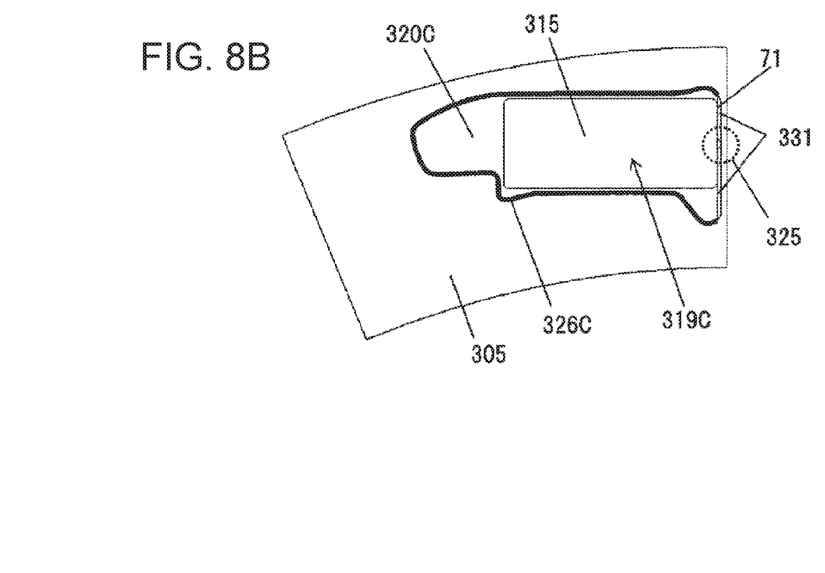
Figure 8C:
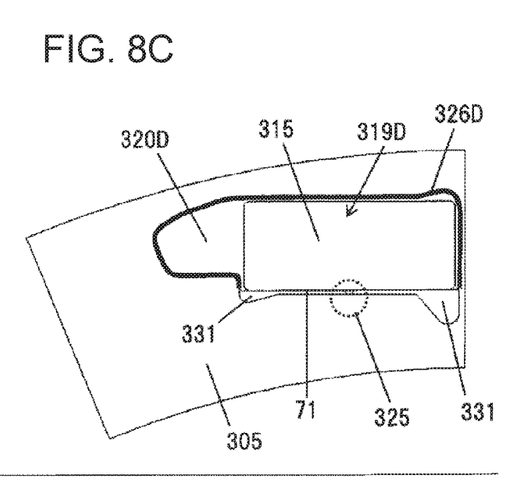

FIGS. 8(a) to 8(c) illustrate variations of the magnet fixing member 320 of the press fit body 319 according to the first embodiment illustrated in FIGS. 4 and 5. In other words, these are variations about the contact portion 325 with the magnet fixing member 320 and the magnet insertion hole 310.

Variation 1A of Magnet Fixing Member 320

A press fit body 319B illustrated in FIG. 8(a) does not form a gap 331 as illustrated in FIG. 5 between magnet insertion holes 310. This is a different point from the magnet fixing member 320 according to the first embodiment. Accordingly, in the variation, an upper side, a lower side, and a right side of the press fit body 319B come into surface-contact with the magnet insertion hole 310 by a surface contact portion 326B indicated by a bold line in FIG. 8(a). A contact area with the magnet insertion hole 310 is increased since the gap 331 is not formed. Therefore, the press fit body 319B according to the present variation has a higher fixing force than the press fit body 319 illustrated in FIG. 5. A left end of the press fit body 319B in the drawing comes into line-contact with the magnet insertion hole 310 by the line contact portion 325 as with the press fit body 319 illustrated on the left side in FIG. 5. The present variation is an example in which the line contact portion 325 is provided in a circumferential direction of the press fit body 319B.

Variation 1B of Magnet Fixing Member 320

In a magnet fixing member 320C illustrated in FIG. 8 (b), an upper side, a lower side, and a left side of a press fit body 319C in the drawing come into contact with the magnet insertion hole 310 by the surface contact portion 326 indicated by a bold line in FIG. 8(b). A right end of a press fit body 319C *comes* into line-contact with the magnet insertion hole 310 by the line contact portion 325. In a press fit body 319C according to the present variation, the magnet exposed region 71 is provided on a side surface, and therefore a gap 331 is formed between the magnet insertion hole 310. The present variation is an example in which the line contact portion 325 is provided in a circumferential direction of the press fit body 319C as with the above-described variation 1A.

Variation 1C of Magnet Fixing Member 320

In a magnet fixing member 320D illustrated in FIG. 8(c), an upper side, a left side, and a right side of a press fit body 319D in the drawing come into contact with a magnet insertion hole 310 by a surface contact portion 326 indicated by a bold line in FIG. 8(c). A lower end of a press fit body 319D comes into line-contact with the magnet insertion hole 310 by a line contact portion 325. In the press fit body 319D according to the present variation, as in the above-described variation 1B, a magnet exposed region 71 is provided on a side surface, and therefore a gap 331 is formed between the magnet insertion hole 310. The present variation is an example in which the line contact portion 325 is provided in a radial direction of the press fit body 319D, unlike the above-described variations 1A and 1B.

Variation 2 of Magnet Fixing Member 320

Figure 9A:
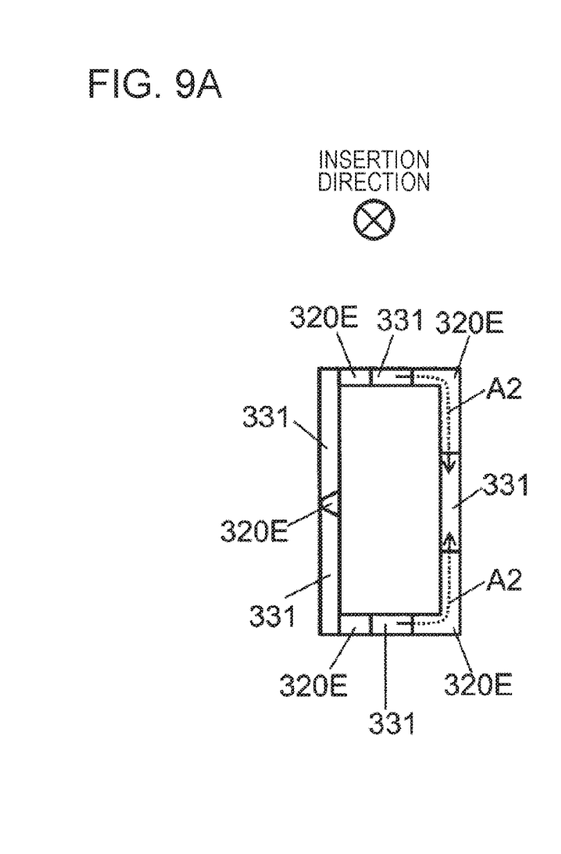
FIGS. 9A and 9B illustrates a second variation of a magnet fixing member.
Figure 9B:
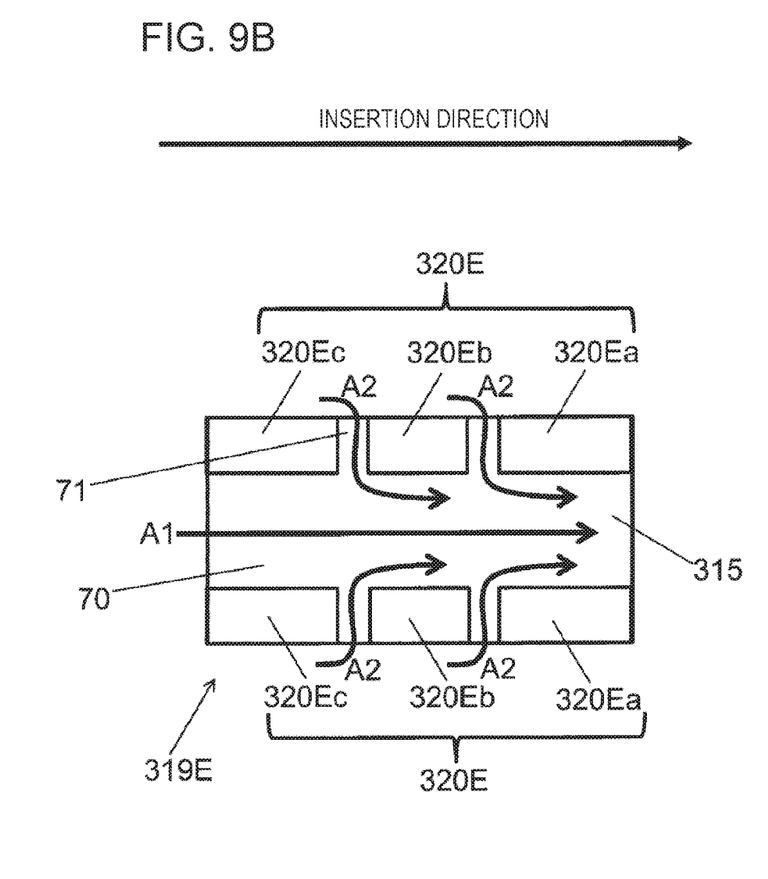

In the above description, the magnet fixing members 320, 320A, 320B, 320C, and 320D are provided so as to extend in a press fit body insertion direction. However, if a permanent magnet is fixed to a magnet insertion hole, the magnet fixing member can be provided by any other manner. For example, the magnet fixing member may be provided as illustrated in FIG. 9. FIG. 9 is a view viewed from a side of a press fit body 319E, specifically a vertical sectional view of the press fit body. Here, the "side" corresponds to a circumferential direction or a radial direction when the press fit body 319E is inserted into a magnet insertion hole 310. Further, a horizontal direction in the drawing is an insertion direction (press fit body insertion direction) of the press fit body 319E. As illustrated in FIG. 9, a magnet fixing member 320E is divided into three press fit body insertion directions 320Ea to 320Ec. In this manner, a magnet exposed region 71 is formed, and an exposed area of a permanent magnet 315 can be increased. Consequently, an area in which the permanent magnet 315 comes into contact with a refrigerant is increased, and the permanent magnet 315 is easily cooled. Further, as illustrated in FIG. 9, if the magnet exposed region 71 becomes a refrigerant path connecting a refrigerant path 70 and a refrigerant path (not illustrated) different from the refrigerant path 70 and extending in a press fit body insertion direction, a refrigerant flows from a circumferential direction (arrows A2 in FIG. 9) of the permanent magnet 315 in addition to from a press fit body insertion direction end (an arrow A1 in FIG. 9), and the permanent magnet 315 can be easily cooled.

In the above description, an inner rotor-type permanent magnet-type rotary electric machine has been described. However, the present invention can be applied in an outer rotor-type permanent magnet-type rotary electric machine.

In the above-described embodiments and variations, a magnet insertion hole is set parallel to a rotating axial direction. Therefore, a press fit body insertion direction (magnet insertion direction) is parallel to a rotating axial direction. However, a magnet insertion hole is not necessarily provided parallel to a rotating axial direction. For example, the present invention can be applied to a permanent magnet rotary electric machine including a rotor in which a magnet insertion hole having a skew (inclined slot) is provided.

The above description is an example of the present invention, and the present invention is not limited to the embodiments. The present invention can be variously varied without impairing characteristics of the present invention.

REFERENCE SIGNS LIST

71: magnet exposed region
100: rotary electric machine
105: housing
110: end bracket
200: stator
205: stator core
206: yoke core
207: teeth core
210: slot
215: stator winding
300: rotor
305: rotor core
310: magnet insertion hole
311: dent
315: permanent magnet
316: magnetic gap
317: auxiliary magnetic pole
319, 319A, 319B, 319C, 319D, 319E: press fit body
320, 320A, 320B, 320C, 320D, 320E: magnet fixing member
321: first press fit portion
322: second press fit portion
325: line contact portion
326, 328, 329: surface contact portion
327: magnet protection member
330, 331: gap
335: rotor core end surface
340: end plate
345, 346: bearing
350: shaft
400: air gap

The invention claimed is:

1. A permanent magnet-type rotary electric machine, comprising a stator and a rotor disposed corresponding to the stator via a gap,
wherein the rotor comprises a rotor core including a plurality of magnet insertion holes in a circumferential direction, and a press fit body press-fitted to each of the magnet insertion holes, the press fit body comprises a permanent magnet extending in an insertion direction of the magnet insertion hole (hereinafter called a press fit body insertion direction) and a magnet fixing member formed of an elastic material and extended on a side surface of the permanent magnet in the press fit body insertion direction,
in either one of a circumferential direction and a radial direction, the magnet fixing member comprises a line contact portion brought into line-contact with an inner wall of the magnet insertion hole in the press fit body insertion direction on one end and comprises a surface contact portion brought into surface-contact with the inner wall of the magnet insertion hole on another end,
the press fit body is fixed in the magnet insertion hole since the line contact portion and the surface contact portion come into contact with the inner wall, and
the magnet fixing member has a first press fit portion and a second press fit portion separated from the first press fit portion, the first press fit portion having the line contact portion, with the first press fit portion directly contacting at least three different surfaces of the permanent magnet.

2. The permanent magnet-type rotary electric machine according to claim 1, wherein the line contact portion and the surface contact portion of the magnet fixing member are extended to come into contact with the inner wall in a whole area in the press fit body insertion direction.

3. The permanent magnet-type rotary electric machine according to claim 1, wherein a gap which communicates between axial end surfaces of the rotor core is provided between an inner wall of the magnet insertion hole and the press fit body.

4. The permanent magnet-type rotary electric machine according to claim 3, wherein the press fit body comprises an exposed region in which the line contact portion does not completely surround an outer perimeter of the permanent magnet, the exposed portion extending along the press fit body insertion direction and the gap comprises a first gap defined by facing an inner wall of the magnet insertion hole and the magnet fixing member and a second gap defined by facing the inner wall of the magnet insertion hole and the exposed region of the permanent magnet.

5. The permanent magnet-type rotary electric machine according to claim 1, wherein the press fit body is divided into two in the press fit body insertion direction, on a rotor core end surface side of the divided first and second press fit bodies, a magnet protection member is provided which projects in an axial direction from the rotor core end surface and has a contour shape larger than a contour shape of the magnet insertion hole, and the magnet protection member comes into contact with the rotor core end surface.

6. A method for manufacturing a permanent magnet-type rotary electric machine, the permanent magnet-type rotary electric machine comprising a stator and a rotor disposed corresponding to the stator via a gap,
wherein the rotor is manufactured by steps of:
preparing a rotor core in which a plurality of electromagnetic steel sheets including magnet insertion holes in an axial direction is laminated;
preparing a press fit body at least including a permanent magnet and a magnet fixing member formed of an elastic material and provided on a side surface of the permanent magnet; and
fixing the press fit body to the magnet insertion hole by press-fitting the press fit body to the magnet insertion hole while the press fit body is brought into line-contact with an inner wall of the magnet insertion hole by the magnet fixing member on one end and brought into surface-contact with the inner wall of the magnet insertion hole by the magnet fixing member on another end, in either one of a circumferential direction or a radial direction when the press fit body is inserted into the magnet insertion hole, wherein
the manufactured rotor is arranged on an inner peripheral side or an outer peripheral side of the stator, and
the magnet fixing member has a first press fit portion and a second press fit portion separated from the first press fit portion, the first press fit portion having the line contact portion, with the first press fit portion directly contacting at least three different surfaces of the permanent magnet.

7. The method according to claim 6, further comprising:
forming a gap which communicates axial end surfaces of the rotor core between an inner wall of the magnet insertion hole and the press fit body, wherein
the press fit body comprises an exposed region in which the line contact portion does not completely surround an outer perimeter of the permanent magnet, the exposed portion extending along the press fit body insertion direction and the gap comprises a first gap defined by facing an inner wall of the magnet insertion hole and the magnet fixing member and a second gap defined by facing the inner wall of the magnet insertion hole and the exposed region of the permanent magnet.

* * * * *